Dec. 2, 1952     V. E. JEWELL     2,619,799
MULTIPLE MOTOR, HYDRAULIC DIFFERENTIAL DRIVE
Filed Feb. 26, 1948     3 Sheets-Sheet 1
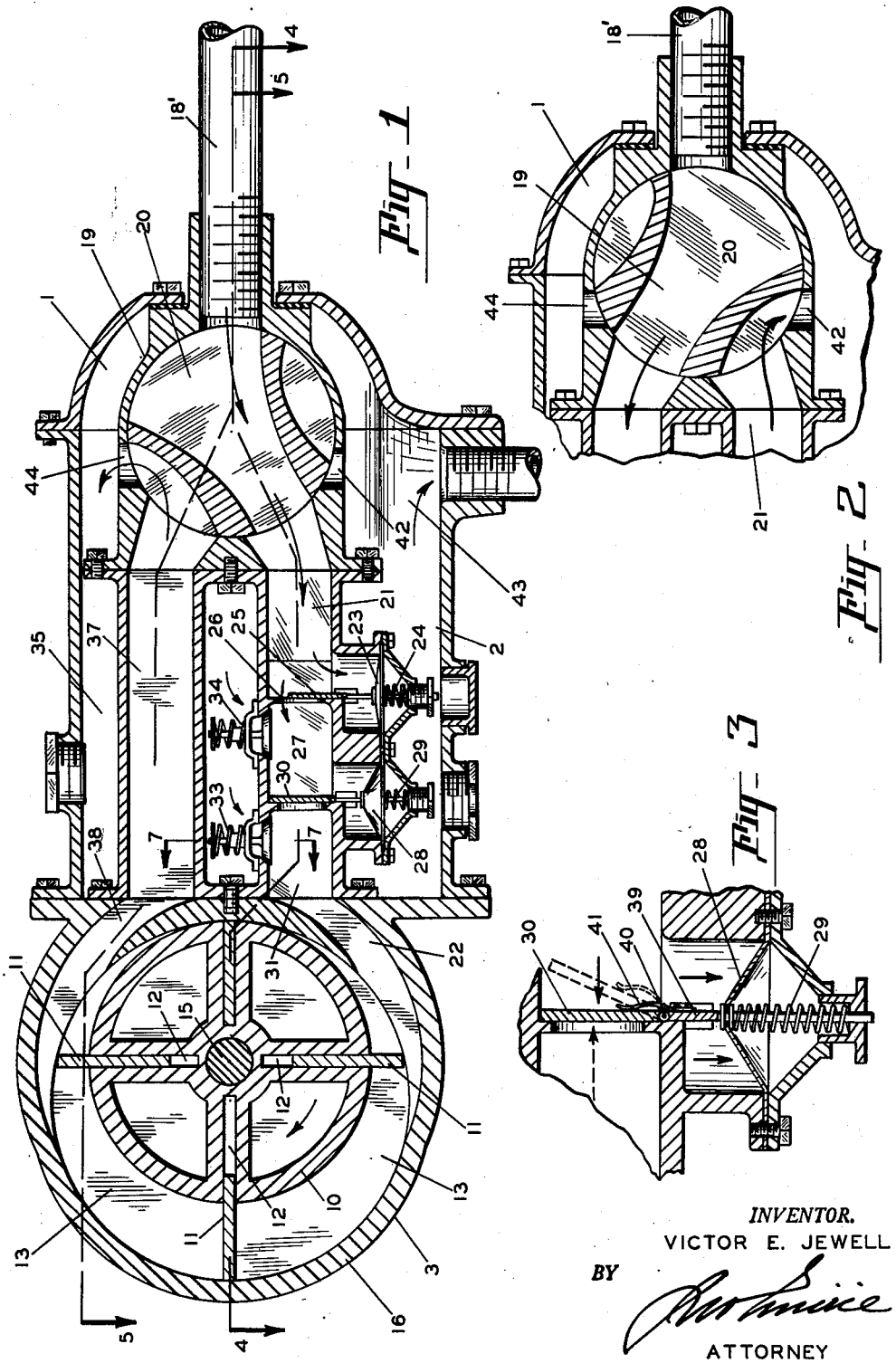
INVENTOR.
VICTOR E. JEWELL
ATTORNEY

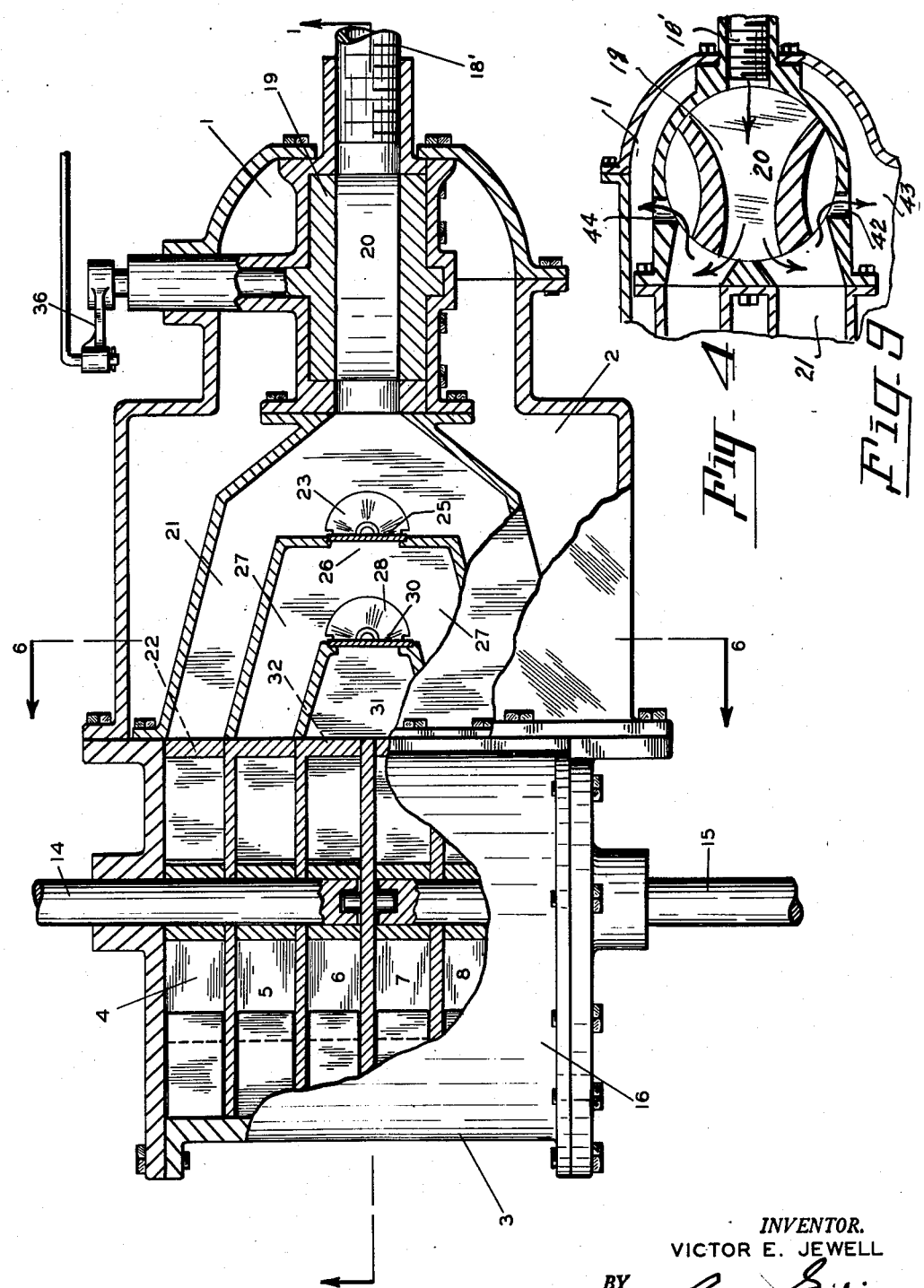

Dec. 2, 1952 V. E. JEWELL 2,619,799
MULTIPLE MOTOR, HYDRAULIC DIFFERENTIAL DRIVE
Filed Feb. 26, 1948 3 Sheets-Sheet 3
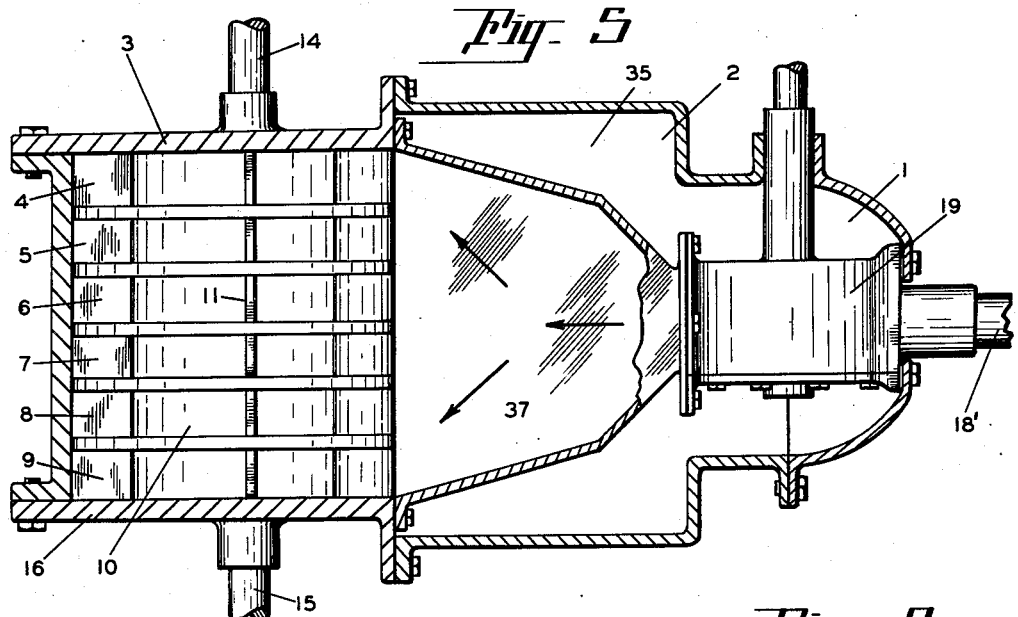
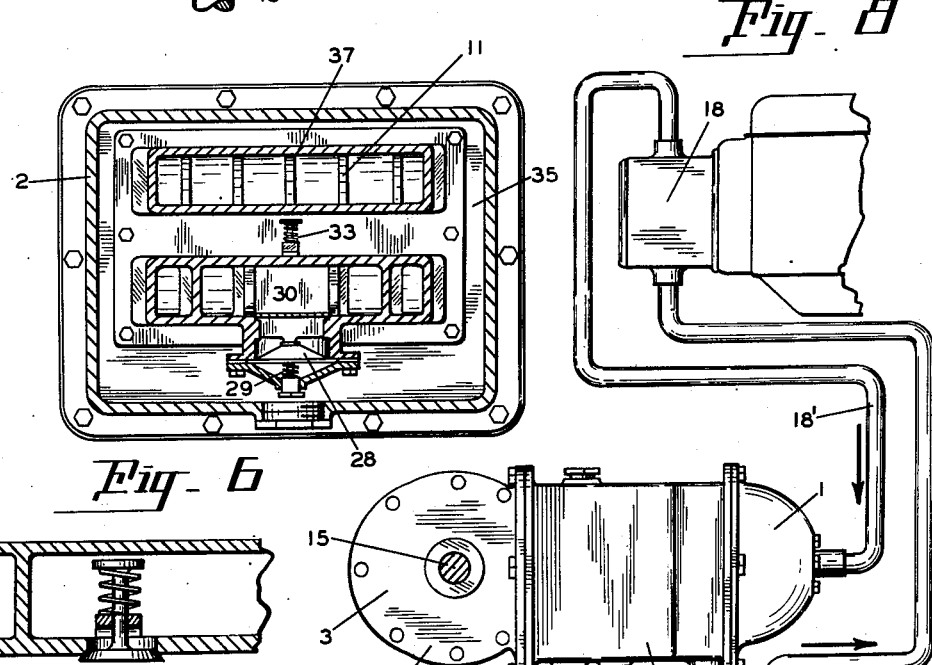
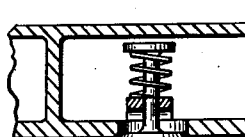
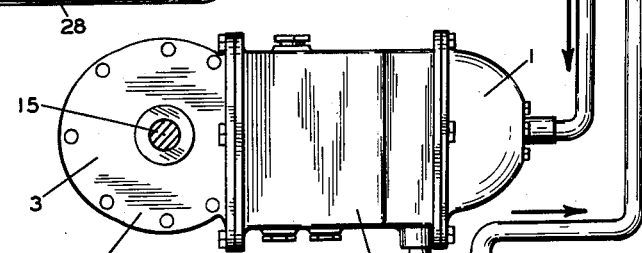
INVENTOR.
VICTOR E. JEWELL
BY
ATTORNEY Patented Dec. 2, 1952

2,619,799

UNITED STATES PATENT OFFICE 2,619,799

MULTIPLE MOTOR, HYDRAULIC DIFFERENTIAL DRIVE

Victor E. Jewell, Forest Grove, Oreg., assignor of ten per cent to Victor A. Jewell, ten per cent to Arthur W. Jewell, twenty-five per cent to Paul A. Thompson and ten per cent to Bill E. Sparks, all of Forest Grove, Oreg.; Erma Pauline Jewell, executrix of said Victor E. Jewell, deceased Application February 26, 1948, Serial No. 11,164

5 Claims. (Cl. 60—53)

The invention relates to fluid drive power transmissions and is particularly adapted for the driving of vehicles.

The primary object of the invention is to provide a fluid drive which is entirely automatic in its operation. Under heavy loads more piston area of the motors is exposed to the driving fluid, on lighter loads a lesser piston area is exposed to the fluid pressure providing for higher speed ratios and lower torque with the same pressure and volume of fluids being delivered to the motors. With the conventional type of fluid drives it is necessary to have a transmission to take care of the various speeds and loads, but with my new and improved fluid drive, a greater or lesser number of motors are brought into effect automatically determined by the back pressure of the fluid being delivered to the motors.

A still further object of my invention, in the case of vehicles, no differential gears are required even though the power is being delivered from a single power transmission to the driving wheels.

These and other incidental objects will be apparent in the drawings, specification and claims.

Referring to the drawings:

Figure 1 is a longitudinal sectional view of my new and improved fluid drive transmission, taken on line 1—1 of Figure 4. This view illustrates the same in forward driving position.

Figure 2 is a detail fragmentary sectional view taken of the control valve showing the same in reversed position.

Figure 3 is an enlarged sectional view of one of the automatic pressure control valve assemblies.

Figure 4 is a plan view of my new and improved fluid transmission partially broken away for convenience of illustration, the cut away taken on line 4—4 of Figure 1.

Figure 5 is a plan sectional view taken on line 5—5 of Figure 1, this view being taken through the reverse fluid port.

Figure 6 is an end sectional view taken through the fluid ports and the pressure control valves, the same taken on line 6—6 of Figure 4.

Figure 7 is a detail fragmentary sectional view of the vacuum control valve taken on line 7—7 of Figure 1.

Figure 8 is a side view of my new and improved fluid transmission illustrating the same connected to a source of fluid power.

Figure 9 is a cross-sectional view through the control valve in neutral position.

Referring more specifically to the drawings:

My new and improved transmission consists of three separate units, first the fluid control valve unit 1, the unit 2 consisting of the delivery ports from the valve unit 1 to the motor unit 3. The motor 3 consists of rotors 4, 5, 6, 7, 8 and 9. These rotors may be of any suitable conventional type, having float valves or blades 11 slidably mounted within the slots 12 and operating within the rotor chambers 13. The rotors 10 are keyed to the driven shafts 14 and 15, the rotors 4, 5 and 6 being keyed to the shaft 14, while the rotors 7, 8 and 9 are keyed to the shaft 15; the said rotors are mounted off center relative to the housing 16, the object of which will be more fully described later on.

Referring to Figure 8, a pump 18 circulates fluid through the piping 18' into the valve unit 1. This valve unit consists of a rotary valve 19 having a master port 20 formed therein. Referring to Figure 1 this valve is in a position to direct fluid from the supply pipe 18' into the outer fluid passage 21, through the valve unit assembly 2. The fluid then enters the motor unit 3 through the port 22 striking the rotor blades 11 and revolving the rotor in the direction of the arrow. This fluid is applied to the rotors 4 and 9 simultaneously, rotating the shafts 14 and 15 at the same speed, or at a different speed in the event a differential of speed is required between said shafts.

When only the outer fluid passage 21 is being used with only the one set of rotors 4 and 9 being under pressure the fluid drive transmission is in high gear, the reason for this being that the two rotors are absorbing the full amount of fluid through the valve 19 with a more or less relatively small area of piston surface being exposed to this flow. When only the said rotors are being driven, they must travel at a high rate of speed in order to consume the full fluid flow, but operating under a relatively low torque.

In the event the load or torque on the shafts 14 and 15 is increased it is desired to bring into action additional rotors as for instance rotors 5 and 8. When this happens the pressure within the outer fluid passage 21 is being brought up to a high pressure due to the increased torque being applied to the rotors 4 and 9. This pressure is in contact with the diaphragm 23 tending to overcome the tension of the spring 24. When this happens the gate valve 25 opens the port 26 allowing fluid to enter into the intermediate fluid passage 27 delivering the same to the rotors 5 and 8 increasing the cross sectional area of the blades 11 to the fluid pressure, also decreasing the speed of the shafts 14 and 15 and exerting a greater torque to said shafts.

In the event a greater torque is required, the same operation takes place relative to the rotors 6 and 7, the pressure within the intermediate fluid passage 27 being increased, which will force the diaphragm 28 down against the spring 29 and open the gate valve 30 allowing fluid to enter from the intermediate fluid passage 27 into the inner fluid passage 31, thence into the rotors 6 and 7 by way of the ports 32. This will provide the lowest speed and the greatest amount of pulling power.

In the event the load decreases or torque on the shafts 14 and 15 is reduced the spring 29 of the valve 28 will close the gate valve 30 shutting off the fluid supply to the rotors 6 and 7 increasing the speed of the motor 3. It can be readily seen how automatic my fluid transmission is, all depending upon the back pressure exerted against the fluid supply as to the automatic shifting into greater torque and lower speed or vice versa.

In the event the transmission is running in high gear and the rotors 5, 6, 7 and 8 are inactive, automatic check valves 33 and 34 are opened preventing a vacuum being created within these rotors. These valves communicate with the reservoir space 35 which surrounds the fluid passages and valve assemblies. The fluid from the rotors 4, 5, 6, 7, 8 and 9 is exhausted through the fluid distributing passage 37 and the port 44 of the valve 19 into the reserve chamber 35.

I will now describe the operation of my new and improved fluid transmission while being operated in reverse. The valve 19 is rotated by its control lever 36 to the position shown in Figure 2. This will direct fluid from the supply line 18 through the port 20 through the fluid distributing passage 37 into the ports 38, all of the rotors being revolved in the opposite direction to the arrow. The fluid is exhausted into the fluid passages 31 and 27 and 21 from the rotors while the motor is running in reverse. The fluid enters the inner fluid passage 31 and must pass through the valve 30 which is hingedly mounted to the stem 39 of the diaphragm 28 at 40 and referring to Figure 3 the dotted arrow indicates the direction of the exhaust fluid forcing the valve 30 to the dotted position against the spring 41 and entering into the intermediate fluid passage 27 and thereafter through the valve 25 in a similar manner into the outer fluid passage 21 and through the port 42 of the valve 19 back into the reservoir 35 at 43.

It is believed from the drawings and above description that the objects of my invention are fully disclosed, which are primarily the bringing into effect additional fluid driven motors as the torque or load increases and the cutting out of fluid driven rotors as the torque is decreased and an increase in speed is attained. This gives a fully automatic conversion from high to low speed or vice versa depending upon the back pressure exerted against the fluid supply.

What I claim, as new, is:

1. A device of the character described comprising a cylindrical motor housing and a valve casing attached to the side wall of the housing intermediate its ends, two axially aligned driven shafts eccentrically journalled in said housing, with one end of each shaft extending from each end of the housing, said housing having partitions therein providing separate motor chambers for each shaft and each of said chambers is sub-divided into three motor chambers for each shaft, an eccentrically positioned vane type rotor journalled in each of the six motor chambers and fastened to their respective shaft, a fluid inlet and a fluid outlet for each motor chamber, a valve block supported in said valve casing in spaced relation to the inner walls of said casing to provide a reservoir surrounding the valve block, a reversing valve positioned in the end of the valve block remote from the motor housing, supply conduits extended from the reversing valve to the motor inlets, said conduits including an outer manifold connecting the inlets of the two outermost motor chambers and communicating with the supply port of the reversing valve, an intermediate manifold connecting the inlet ports of the two intermediate motor chambers and communicating with the outer manifold through a valved port, and an inner manifold connecting the inlet ports of the two innermost motor chambers and communicating with the intermediate manifold through a valved port.

2. The invention as in claim 1 wherein the valve block also includes a return manifold connecting the outlet ports of all six motor chambers and communicating with the return port of the reversing valve, and said reversing valve is provided with a pressure port leading to the reservoir.

3. The invention as in claim 1 wherein the valves between the manifolds are spring biased to closed position and are pressure actuated to provide fluid flow from the outer manifold to the intermediate manifold and from the latter manifold to the inner manifold.

4. The invention as in claim 1 wherein the valves between the manifolds are hinged and are spring biased to their extended position whereby they will swing open to provide unrestricted reversed flow during reverse operation.

5. The invention as in claim 1 wherein the intermediate and inner manifolds are also provided with valved ports leading to the reservoir, said valves opening toward the manifolds and being spring biased to closed positions, said valves being compensating valves to admit fluid to the intermediate and innermost motor chambers when they are not being supplied with fluid pressure.

VICTOR E. JEWELL.

REFERENCES CITED

The following references are of record in the file of this patent:

UNITED STATES PATENTS

| Number | Name | Date |
| --- | --- | --- |
| 470,095 | Atwood | Mar. 1, 1892 |
| 1,156,817 | Rich | Oct. 12, 1915 |
| 1,634,697 | Thorsby | July 5, 1927 |
| 2,023,524 | Heaton | Dec. 10, 1935 |
| 2,370,526 | Doran | Feb. 27, 1945 |

FOREIGN PATENTS

| Number | Country | Date |
| --- | --- | --- |
| 188,043 | Great Britain | Oct. 30, 1922 |